United States Patent [19]

Savioli

[11] Patent Number: 5,620,719

[45] Date of Patent: Apr. 15, 1997

[54] MACHINE FOR BELL-FORMING ENDS OF THERMALLY PLASTICIZED PIPES

[75] Inventor: Leopoldo Savioli, Alfonsine, Italy

[73] Assignee: S.I.C.A. Serrande, Infissi, Carpenteria, Attrezzatura S.p.A., Alfonsine, Italy

[21] Appl. No.: 432,720

[22] Filed: May 2, 1995

[30] Foreign Application Priority Data

May 2, 1994 [IT] Italy ................................ BO94A0189

[51] Int. Cl.$^6$ .................................................. B29C 57/06
[52] U.S. Cl. ............. 425/387.1; 425/372; 425/DIG. 218
[58] Field of Search ................................. 425/393, 387.1, 425/DIG. 218

[56] References Cited

U.S. PATENT DOCUMENTS

| | | | |
|---|---|---|---|
| 3,672,804 | 6/1972 | Dalik | 425/393 |
| 3,776,682 | 12/1973 | Parmann | 425/393 |
| 3,849,052 | 11/1974 | Gordon | 425/387 |
| 3,923,443 | 12/1975 | Emery et al. | 425/393 |
| 3,932,094 | 1/1976 | Korff et al. | 425/393 |
| 4,008,028 | 2/1977 | Ronden et al. | 425/393 |
| 4,266,926 | 5/1981 | Gordon | 425/387.1 |
| 4,323,337 | 4/1982 | Korff et al. | 425/393 |
| 4,353,860 | 10/1982 | Gordon | 264/519 |
| 4,545,951 | 10/1985 | Gordon | 264/322 |

FOREIGN PATENT DOCUMENTS

| | | | |
|---|---|---|---|
| 0516595 | 12/1992 | European Pat. Off. | B29C 57/08 |
| 2507023 | 8/1975 | Germany | B29C 57/08 |

*Primary Examiner*—Robert Davis
*Attorney, Agent, or Firm*—Cushman Darby & Cushman IP Group of Pillsbury Madison & Sutro LLP

[57] ABSTRACT

The invention relates to a machine for bell-forming ends of thermally plasticized pipes, including a vise for blocking pipes having jaws which are mobile along a vertical plane, wherein the introduction and unloading of the pipes occurs tangentially to the plane. The machine is provided with a forming device having a pressurized-fluid forming chamber, internally containing a forming chuck. The forming chamber exhibits an elastic wall which is strengthened during the pressurization operation by rigid striking elements borne directly by the jaws of the vice, and is fed by a single pipe for feeding fluid for pressurization of the forming chamber and for cooling the chuck.

7 Claims, 3 Drawing Sheets

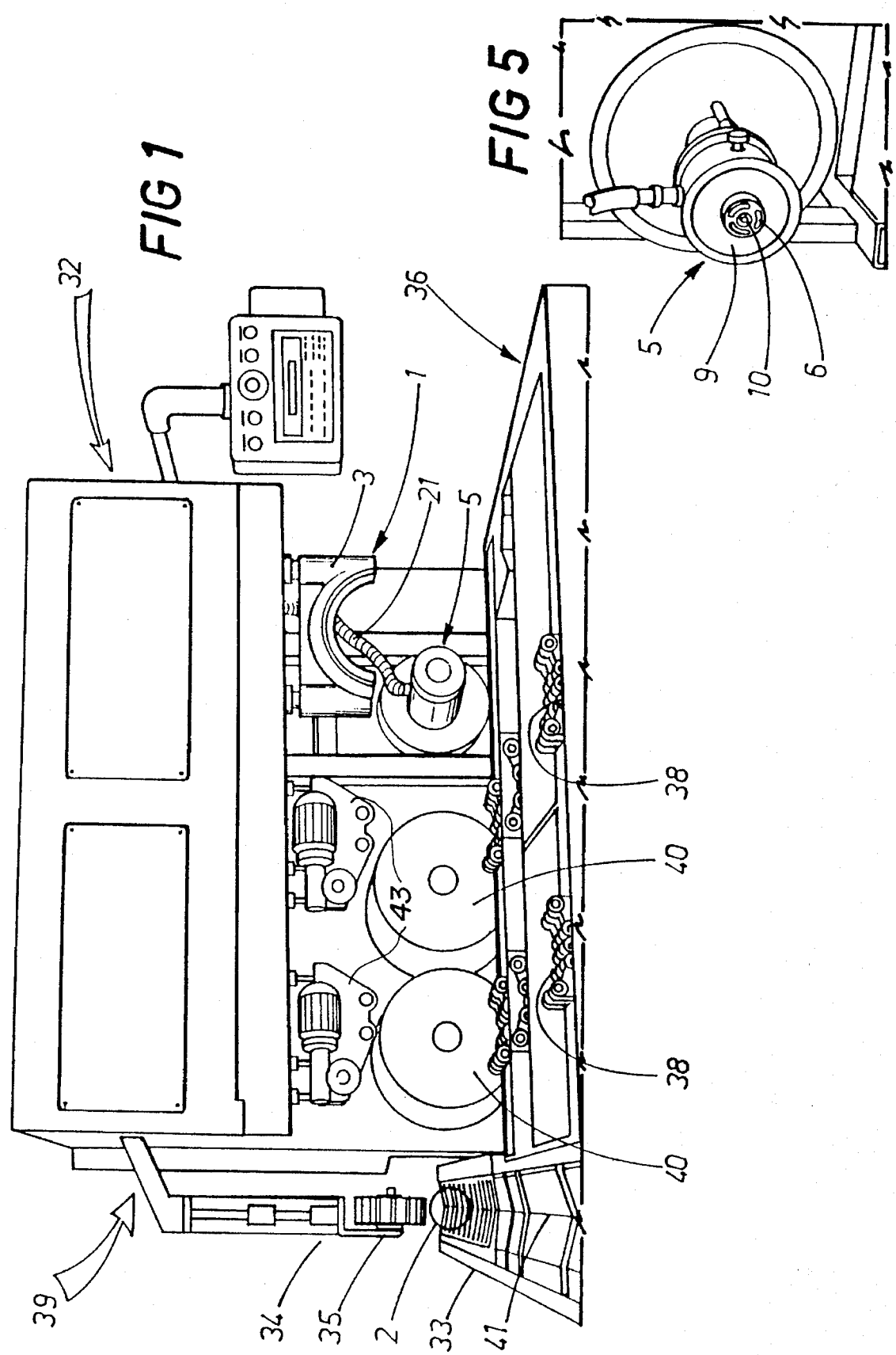

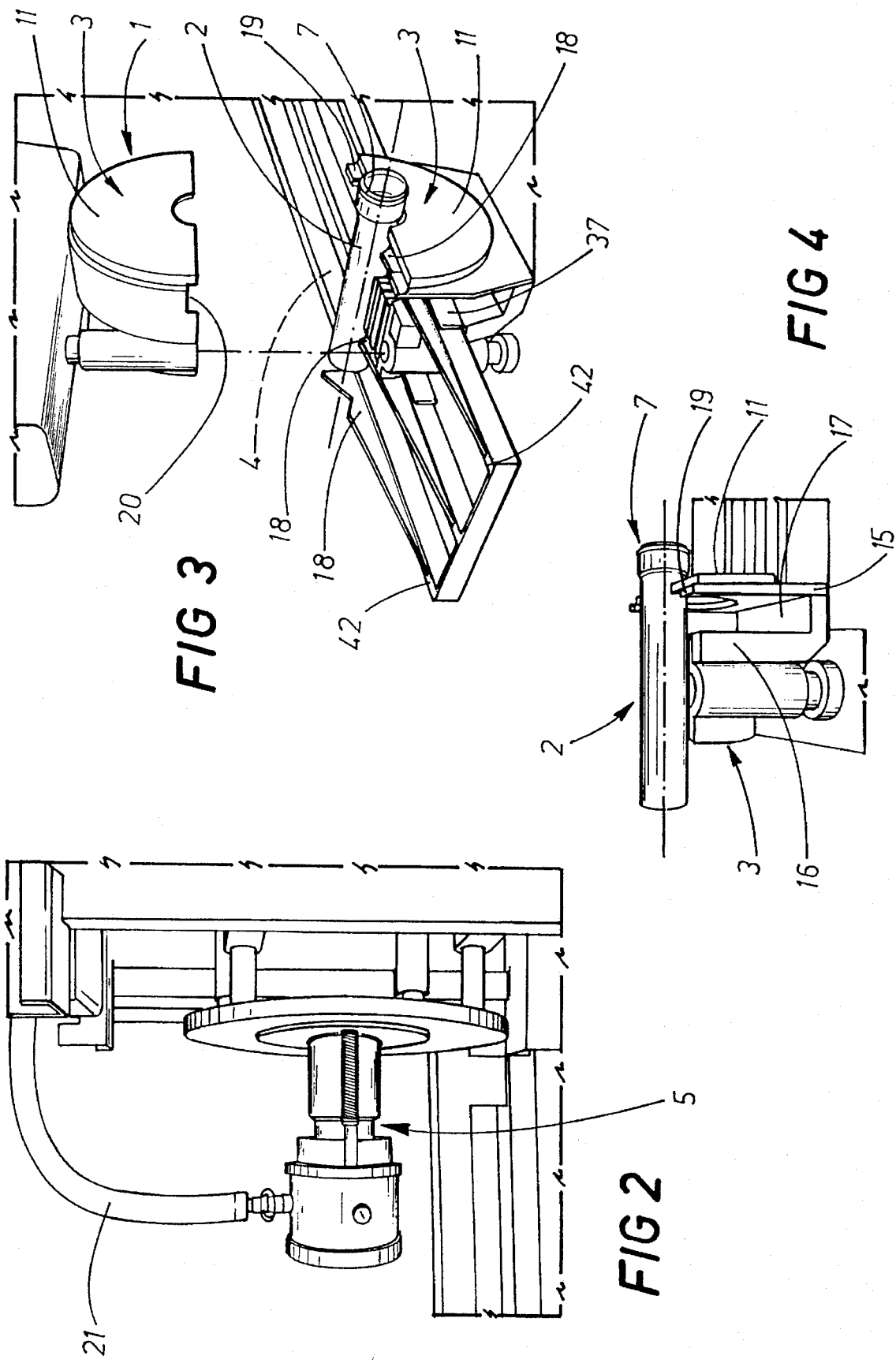

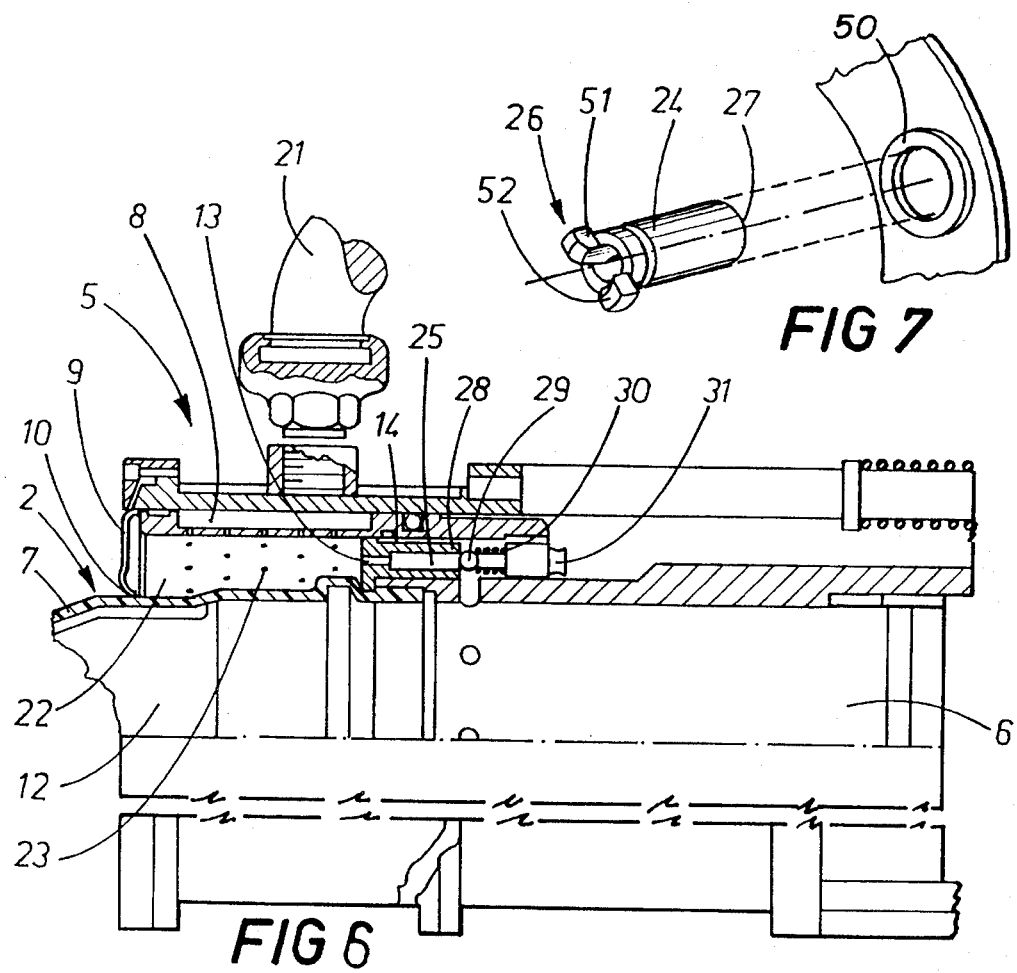
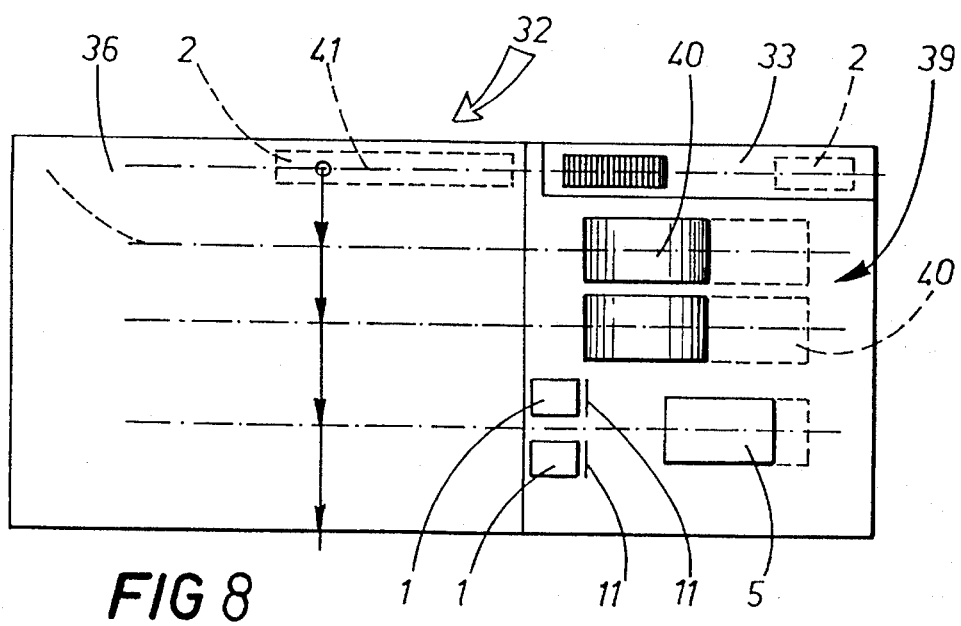

5,620,719

MACHINE FOR BELL-FORMING ENDS OF THERMALLY PLASTICIZED PIPES

BACKGROUND OF THE INVENTION

In the prior art, bell-forming machines usually comprise a workhead provided with at least one kiln for heating the pipes and a forming device, both associated to a bench provided with suitable means for moving the pipes, on which bench the pipes are transported in a continuous cycle.

The pipe, during the forming process, is held in the work position by vises having jaws which are mobile in a vertical plane.

The prior art in this filed teaches substantially two types of vise. In a first type the jaws are slidable along guide columns, while in a second type, realized by the present applicant, the guide columns are absent. In the latter case, the jaws are mobile independently one from the other and are reciprocally aligned thanks to the structure of the machine which supports them.

In all bell-forming machines, the various pipe sections, consisting of straight lengths of pipe, are sent by one and continuously on to the bench, along a direction coinciding with the axis of symmetry of the pipe.

After having reached the bench, the pipe sections are turned transversally to their original direction, through intermittent step-movements, remaining all the time parallel to one another. During the pauses between one step and a next, the pipes undergo the single work operations which essentially consist in heating up (in the kiln) the end thereof to be belled, followed by constraining in the vise and, finally, the forming operation. Both the kiln for the heating phase and the forming device for the bell-forming phase are mobile on trucks, and are neared and distanced from the pipe during the various work phases.

A first drawback of the bell-forming machines provided with jaws on guide columns is that during the work cycle the pipe being formed has to be moved two extra times in a perpendicular direction to the vertical plane on which the jaws move, in order not to interfere with the guide columns. A first of the two movements transports the shaped ends past the guide columns before the ends are gripped in the vise, so that the end of the pipe to be formed can be neared to the forming device located (with respect to the vise) on the opposite side to the pipe end on the bench. Then, when the forming operation has been completed, a movement in a contrary direction to the first has to be performed to bring the pipe back into its original position on the bench.

As can be gleaned from the above, the work cycle of bell-forming machines having guide columns is longer and less economical than that of similar machines not having guide columns.

The type not provided with guide columns also present drawbacks, connected mostly with the fact that they are mechanically and electronically more complex, and therefore more expensive.

Their greater complexity is due to the fact that bell-forming machines having pressurised-fluid forming chambers operating with an elastic wall must be further equipped with rigid striker elements to meet and support the elastic wall during a pressurisation phase.

These striker elements, in bell-forming machines provided with guide columns, are easily positionable on the jaws themselves. In bell-forming machines not provided with guide columns, a supplementary truck has to be provided for supporting said elements, and naturally said truck must, in its movements, be synchronized with the remaining parts of the machine.

SUMMARY OF THE INVENTION

The main aim of the present invention is to obviate the above-mentioned drawbacks.

The invention achieves the above-mentioned aim by providing a machine for bell-forming ends of thermally-plasticized pipes, comprising:

a vise for blocking pipes, the vise exhibiting jaws which are mobile along a vertical plane, wherein introduction and unloading of the pipes occur tangentially to said vertical plane;

a bell-forming device comprising a chuck which is associable to an end of the thermally-plasticized pipe.

The chuck is contained in a pressurized-fluid forming chamber having an elastic wall provided with a hole, through which hole the end of the pipe accesses the forming chamber while the latter is in a pressurized state.

The machine further comprises rigid striker elements borne directly by the jaws of the vise, which elements support the elastic wall during the pressurization phase of the forming chamber.

One of the advantages obtained by the machine realized according to the present invention essentially consists in obtaining work cycles which are considerable faster than prior art realizations, and wherein useless movements have been obviated.

The machine according to the invention further comprises a smaller number of moving parts, so that the machine is indeed less complex in construction and thus is less costly to acquire while at the same time offering greater reliability.

Thanks to a special structuring of the vise jaws and the pipe support bench, two rest points are constantly provided for the pipes. This means that considerably shorter pipes can be formed in comparison to what is possible with machines having guide columns, where the workpiece is projectingly supported and may not be below a certain length.

BRIEF DESCRIPTION OF THE DRAWINGS

Further characteristics and advantages of the present invention will better emerge from the detailed description that follows, of an embodiment of the invention, illustrated in the form of a non-limiting example in the accompanying drawings, in which:

FIG. 1 is perspective total view of a bell-forming machine realized according to the invention;

FIG. 2 shows an enlarged-scale detail of the machine of FIG. 1, in perspective lateral view;

FIG. 3 is a partial perspective view of the machine of FIG. 1 showing the side thereof exhibiting the pipe forming chamber;

FIG. 4 is a perspective partial lateral view of some elements of FIG. 3, with other parts removed;

FIG. 5 is a partial perspective view, in enlarged scale, of some details of FIG. 2, viewed from the workbench for the pipes;

FIG. 6 shows, in enlarged scale, a section of the total forming device;

FIG. 7 is a perspective view of a detail of the forming device;

FIG. 8 is a schematic illustration of a total arrangement of the principal parts of the machine, evidencing the flow lines of the pipes during a work cycle.

DESCRIPTION OF THE PREFERRED EMBODIMENTS

With reference to FIG. 1, the invention consists of a machine, indicated in its entirety by 32, for forming bell ends 7 in thermally plasticized pipes 2.

The machine 32 comprises (see also FIG. 8) a horizontal channel 33 for entraining the pipes 2 to be formed, a bench 36 for transport of the pipes 2 during the work phases of the machine 32, a head 39 positioned at a side of the bench 36 and the horizontal channel 33 bearing the pipes 2. A small motorized chain 35 conveyor 34 is provided superiorly to the horizontal channel 33, is supported on the machine 32 and is vertically mobile such as to engage the pipes 2 present in the horizontal channel 33 and advance them according to a direction coinciding with an axis of symmetry 41 of the pipes 2.

The bench 36 is provided with means 37 for vertically lifting and horizontally translating (see FIG. 3) the pipes 2. The means 37 are located flush with the bench 36 and remove the pipes 2 from the channel 33, transferring them on to a series of supports 38 arranged on the bench 36.

The work head 39 comprises two kilns 40 for heating and plasticizing the ends 7 of the pipe to be formed; during this operation the pipe 2 is arranged alignedly with the kilns 40 on the supports 38 of the bench 36 and is set in rotation with respect to its axis of symmetry 41 by motorized drawers 43 supported by the workhead 39 of the machine 32.

The work head 39 further comprises (see FIG. 3):

a vise 1 for constraining pipes 2, having jaws 3 which are mobile along a vertical plane 4, wherein the introduction and unloading of pipes 2 coming from the bench 36 happens in a tangential direction to the vertical development plane 4 of the jaws 3;

a forming device 5 (see FIGS. 5 and 6) comprising a forming chuck 6, which forming device 5 is provided with an internal cavity 12 for cooling, associable to an end 7 of the pipe 2, (which by this point has been thermally plasticized in the kilns 40), and which forming device is contained in a pressurized-fluid forming chamber 8; said chamber 8 having an elastic wall 9 affording a hole 10 through which the end 7 of the pipe 2 accesses the forming chamber 8 under pressurized conditions.

The forming machine 32 further comprises rigid striker elements 11 borne directly by the jaws 3 of the vice 1, which elements 11 are associable to the forming device 5 such as to support the elastic wall 9 during pressurization of the forming chamber 8.

More in detail (see FIG. 3), the striker element 11 associated to the lower jaw 3 is supported on a wall 15 projecting from a body 16 of the jaw 3. An intermediate cavity (17) is provided between the wall (15) and the body (16) of the jaw (3), in which cavity (17) structural elements (42) of the bench (36) are inserted for the pipe (2), on which supports (18) the pipe (2) is arranged, bilaterally to the jaw (3) of the vice (1).

The wall 15 has shaped ends 19 which during the closure of the vice 1 enter seats 20 fashioned on the upper jaw 3 of the vice 1.

FIGS. 5 and 6 show that the forming device 5 comprises a single pipe 21 for entry of the pressurizing fluid into the forming chamber 8 and for cooling the chuck 6, as well as an intercommunicating conduit 13 between the forming chamber 8 and the internal cavity 12 for cooling said chuck 6.

The intercommunicating conduit 13 exhibits a tubular body 24 having a cavity 25 passing from a first end 26 associated to the forming chamber 8 and a second end 27 associated to the internal cavity 12 for cooling the forming chuck 6; the intercommunicating conduit 13 being associated also with means 14 for reacting to the pressure of the fluid contained in the forming chamber 8.

The tubular body 24 is inserted in a seat 50 of the forming chuck 6 and projects with a head 51 exhibiting tabs 52 from a peripheral channel in the forming chuck 6.

The means for reacting to the pressure 14 of the fluid preferably comprise, at the second end 27, a valve 28 provided with an obturator 29, which obturator 29 is opposed by an adjustable-pressure reaction spring 30, with adjustment thereof being performed by means of an adjusting element 31 associated to the chuck 6.

The valve 28 is adjusted such as to intercept the intercommunicating conduit 13 from a predetermined minimum threshold pressure value up to an also-predetermined maximum threshold value. Once the maximum threshold value has been reached, the obturator 29 in the value 28 opens due to excess of pressure in the fluid fed from the pipe 21, while a part of the fluid contained in the forming chamber 8 discharges externally to the forming chamber 8 and, passing through the intercommunicating conduit 13, reaches the internal cavity 12 of the forming chuck 6 and cools the forming chuck 6.

FIG. 6 shows that the forming chamber 8 is provided with a wall 22 having a plurality of holes 23; the wall 22 is contained internally to the forming chamber 8 and is arranged peripherally to the forming chuck 6. The wall 22, coming into contact with the fluid sent to the forming device 5 by the pipe 21 subdivides the entire fluid flow entrained by the pipe 21 into a plurality of smaller flows that prevent any build-up of dynamic excess pressure localized on the end 7 of the pipe 2, thus ensuring a perfect shaping thereof on the forming chuck 6.

The above-described forming device 5 is characterized by the simplicity of its construction with respect to prior art devices, as well as by its smaller volume which, apart from speeding up the pressurization and discharge phases, enables cycle times to be further reduced, economizes on consumption of air and limits the intensity of the thrust borne by the striker elements 11 on the jaws 3 of the vise 1.

A description of a single forming cycle of the machine will now be made, to better illustrate its functional characteristics.

With reference to FIG. 8, a pipe 2 is transported along the horizontal channel 33, in a direction which coincides with its own axis 41, up until it reaches the bench 36.

The pipe 2 is then lifted from the bench 36 by the vertical lifting means 37, transferred horizontally and in a parallel direction to its original position, and is aligned to a first kiln 40. The kiln 40 advances towards the pipe 2 and while said pipe 2 is set in rotation on the supports 38 the kiln 40 heats the end thereof which is to be plasticized. Another kiln, adjacent to the first, performs an identical task.

Upon conclusion of the plasticization phase in the kilns 40 the pipe 2 is aligned with the vise 1 and the forming device 5 lying behind the vise 1.

When the jaws 3 of the vise 1 have been closed, the forming device 5 advances towards the pipe 2 up until the elastic wall 9 strikes against the striker elements 11 of the vise 1.

In the above condition, the pressurizing fluid, usually constituted by compressed air, is sent to the forming chamber 8. As the pressure inside the forming chamber 8 increases, the plasticized end 7 of the pipe 2 locks on the forming chuck 6, and is shaped according to the chuck 6.

When the threshold value of the valve 28 is reached, the valve 28 opens, and while the pressure in the forming chamber 8 stays constant, a flow of air equal to the difference between the feed pressure in the pipe 21 and the threshold pressure of the valve 28 reaches the internal cavity 12 of the forming chuck 6 and cools the same.

When the end 7 of the pipe 2 has solidified, the forming device 5 retracts and the pipe 2, after the opening of the jaws 3, is lifted by the supports 18 of the bench 36 and unloaded by the machine 32 on the opposite side thereof to the introduction side.

What is claimed:

1. A machine for forming bell-ends in thermally plasticized pipes, comprising in combination:

at least one vise for blocking pipes, having an upper and a lower jaw which are mobile along a vertical plane, wherein introduction and unloading of a pipe into the at least one vise occur tangentially to said vertical plane;

a forming device comprising a chuck that is associable to a thermally plasticized end of the pipe, said chuck being contained in a pressurized-fluid forming chamber having an elastic wall having a hole, through which hole the thermally plasticized end of the pipe accesses the forming chamber while in a pressurized state;

rigid striker elements borne directly by the upper jaw and lower jaw of the at least one vise, which rigid striker elements support the elastic wall during a pressurization phase of the forming chamber;

said forming device being provided with at least one intercommunicating conduit between said forming chamber and the internal cavity of the chuck;

means for reacting to a pressure of fluid contained in the forming chamber, being situated in said intercommunicating conduit and reacting to said pressure from a minimum threshold pressure thereof up to a maximum threshold pressure thereof, above which maximum threshold pressure a part of the fluid contained in the forming chamber, passing through said intercommunicating conduit, reaches the internal cavity of the chuck and cools said chuck.

2. A machine as in claim 1, wherein the rigid striker elements associated to the lower jaw of the vise are constrained on a wall supported projectingly by a body of said lower jaw, a cavity for housing a support of the pipe being interpositioned between said wall and said body.

3. A machine as in claim 1, wherein said forming device comprises a single pipe for entraining said fluid for pressurisation of said forming chamber and for refrigeration of said chuck.

4. A machine as in claim 1, wherein said intercommunicating conduit has a tubular body having a cavity passing from a first end of said intercommunicating conduit associated to the forming chamber to a second end thereof associated to the refrigeration cavity of the chuck, said means for reacting to the pressure comprising, at said second end of the intercommunicating conduit, a valve having an obturator opposed by a spring.

5. A machine as in claim 2, wherein said wall has shaped ends which are housable in corresponding seatings made on the upper jaw of the vise.

6. A machine as in claim 3, comprising a wall provided with a plurality of holes, which wall is contained internally of said forming chamber and arranged peripherally to said chuck, said wall having a function of subdividing a flow of fluid entrained from said pipe to said forming device into a plurality of small flows of fluid.

7. A machine as in claim 4, wherein said means for reacting to the pressure comprise an adjusting element of said valve.

* * * * *